(12) United States Patent
Boyle et al.

(10) Patent No.: US 9,467,570 B2
(45) Date of Patent: Oct. 11, 2016

(54) CALL TRANSFER WITH NETWORK SPANNING BACK-TO-BACK USER AGENTS

(71) Applicant: Avaya Inc., Basking Ridge, NJ (US)

(72) Inventors: Frank Boyle, Denver, CO (US); Vipul Rastogi, Pune (IN); Joel M. Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 95 days.

(21) Appl. No.: 14/084,842

(22) Filed: Nov. 20, 2013

(65) Prior Publication Data
US 2015/0139045 A1    May 21, 2015

(51) Int. Cl.
*H04M 3/58* (2006.01)
*H04L 29/06* (2006.01)

(52) U.S. Cl.
CPC ............ *H04M 3/58* (2013.01); *H04L 65/1006* (2013.01); *H04L 65/1033* (2013.01); *H04L 65/1096* (2013.01)

(58) Field of Classification Search
None
See application file for complete search history.

(56) References Cited

U.S. PATENT DOCUMENTS

| | | | |
|---|---|---|---|
| 7,440,440 B1 * | 10/2008 | Abichandani et al. | 370/351 |
| 7,797,006 B2 * | 9/2010 | Sung et al. | 455/518 |
| 7,912,963 B2 * | 3/2011 | Jackson | 709/227 |
| 8,165,280 B1 * | 4/2012 | Robbins | 379/208.01 |
| 8,938,545 B2 | 1/2015 | Ezell et al. | |
| 2001/0003194 A1 * | 6/2001 | Shimura et al. | 709/310 |
| 2005/0250493 A1 | 11/2005 | Elkarat et al. | |
| 2006/0245403 A1 * | 11/2006 | Kumar | 370/338 |
| 2006/0294245 A1 | 12/2006 | Raguparan et al. | |
| 2007/0189220 A1 * | 8/2007 | Oberle et al. | 370/331 |
| 2007/0276907 A1 * | 11/2007 | Maes | 709/204 |
| 2007/0276947 A1 | 11/2007 | Panattu et al. | |
| 2008/0002820 A1 | 1/2008 | Shtiegman et al. | |
| 2008/0037447 A1 * | 2/2008 | Garg et al. | 370/260 |
| 2008/0126541 A1 | 5/2008 | Rosenberg et al. | |
| 2008/0144615 A1 * | 6/2008 | Casey | 370/389 |
| 2008/0162705 A1 | 7/2008 | Cai et al. | |
| 2008/0186954 A1 * | 8/2008 | Kumarasamy et al. | 370/352 |
| 2008/0212764 A1 * | 9/2008 | Fukuta et al. | 379/211.02 |
| 2008/0219265 A1 * | 9/2008 | Fieremans et al. | 370/392 |
| 2008/0310312 A1 * | 12/2008 | Acharya et al. | 370/241 |
| 2009/0031029 A1 * | 1/2009 | Rice | 709/227 |
| 2009/0210538 A1 | 8/2009 | Allen et al. | |
| 2009/0245265 A1 * | 10/2009 | Takeshima et al. | 370/401 |
| 2009/0259515 A1 * | 10/2009 | Belimpasakis et al. | 705/10 |
| 2009/0327516 A1 * | 12/2009 | Amishima et al. | 709/238 |

(Continued)

FOREIGN PATENT DOCUMENTS

| EP | 2299646 | 3/2011 |
|---|---|---|
| WO | WO 2009/105476 | 8/2009 |

OTHER PUBLICATIONS

Boulton et al., "An Extension to the Session Initiation Protocol (SIP) for Endpoint Session View," Internet Engineering Task Force, Mar. 26, 2009, 24 pages.

(Continued)

*Primary Examiner* — Bunjob Jaroenchonwanit
(74) *Attorney, Agent, or Firm* — Sheridan Ross P.C.

(57) ABSTRACT

A communication system, method, and components are described. Specifically, a communication system having the ability to facilitate call transfer across a Session Border Controller (SBC) is provided. The transfer is facilitated by an intelligent mapping process performed at the SBC on one or more messages transmitted during a call transfer.

18 Claims, 6 Drawing Sheets

(56) References Cited

U.S. PATENT DOCUMENTS

| | | | |
|---|---|---|---|
| 2010/0128718 A1* | 5/2010 | Shen et al. | 370/352 |
| 2011/0066694 A1* | 3/2011 | Barrett et al. | 709/207 |
| 2012/0184291 A1* | 7/2012 | Tietsch et al. | 455/456.1 |
| 2013/0177011 A1* | 7/2013 | Carter | 370/352 |
| 2013/0235986 A1* | 9/2013 | Ibrahim | 379/93.01 |
| 2014/0233717 A1 | 8/2014 | Pujic et al. | |

OTHER PUBLICATIONS

IETF, Network Working Group, RFC 5589, Session Initiation Protocol (SIP) Call Control—Transfer, 58 pages.

IETF, Network Working Group, RFC 3891, The Session Initiation Protocol (SIP) "Replaces" Header, 16 pages.

Worley, "Interoperation of "Application Server" B2BUAs with SIP Call Control," Internet Engineering Task Force, Jan. 23, 2010, 16 pages.

Extended European Search Report for European Patent Application No. 12186047.2 dated Apr. 24, 2013, 10 pages.

Official Action with English Translation for Korea Patent Application No. 2012-0108357, mailed Jan. 20, 2014 7 pages.

Notice of Allowance with English Translation for Korea Patent Application No. 2012-0108357, mailed Jul. 24, 2014 3 pages.

Official Action for U.S. Appl. No. 13/485,604, mailed Sep. 4, 2014, 7 pages.

Official Action for U.S. Appl. No. 13/485,604, mailed May 22, 2014, 9 pages.

Official Action for U.S. Appl. No. 13/770,551, mailed Dec. 19, 2014 15 pages.

Official Action for U.S. Appl. No. 13/770,551, mailed Aug. 13, 2015 18 pages.

"3rd Generation Partnership Project; Technical Specification Group Core Network and Terminals; Inter-IMS Network to Network Interface (NNI) (Release 10)," 3GPP Standard: 3GPP TS 29.165, 3rd Generation Partnership Project (3GPP), Mobile Competence Centre, 650, Route Des Lucioles; 5-06921 Sophia-Antipolis Cedex; France, No. V10.2.0, Jan. 7, 2011.

Oberle et al. "Enhanced Methods for SIP based Session Mobility in a Converged Network," 16th IST Mobile and Wireless Communications Summit, 2007 IEEE Piscataway, NJ, USA, Jul. 1, 2007.

Extended Search Report for European Patent Application No. 14193676.5, dated Mar. 25, 2015 9 pages.

\* cited by examiner

CALL TRANSFER WITH NETWORK SPANNING BACK-TO-BACK USER AGENTS

FIELD OF THE DISCLOSURE

The present disclosure is generally directed toward communications and more specifically toward transfers across network boundaries.

BACKGROUND

Session Border Controllers (SBC) are optional border elements which can help securely connect a customer Session Initiation Protocol (SIP) network to external SIP networks. SBCs deal with both media and signaling and can perform protocol adaptation, address translation, enforce complex polices, media transcoding, topology hiding etc. When enabling a call between a private enterprise network and a service provider or endpoint on the public Internet, an SBC changes Internet Protocol (IP) addresses in the Contact, Request-URI, Route, Record-Route and Via headers whenever a SIP message crosses the network boundary. This enables most call flows, but is not sufficient to fully enable call transfers to work across the SBC.

The industry at large has attempted to address this problem by simply not allowing REFER messages (e.g., SIP messages used to facilitate transfers) to propagate across an SBC. Instead, the traditional approach is to have the SBC act on the message itself. This does enable some simple transfers to work, but it causes some problems by not making the new topology of the call apparent to the transferee or the transfer target endpoints. This approach can cause problems for many different types of conference calls.

Some SBCs have attempted to solve the problem by simply passing the REFER with its addresses through without any processing, in particular from the public side to the private side, and assuming that public addresses are routable from the private side. Often this assumption is an inaccurate one.

SUMMARY

It is with respect to the above issues and other problems that the embodiments presented herein were contemplated. In particular, embodiments of the present disclosure propose an enhanced SBC that overcomes the problems identified above. Moreover, the SBC is enabled to operate as a Back-to-Back User Agent (B2BUA) within the call topology.

In some embodiments, a network-spanning B2BUA (e.g., SBC or similar network border element) is configured to process a transfer event according to the following two-step process, which may contain several sub-steps:

First, the transferor initiates a call transfer by sending a REFER request toward the transferee where the REFER request includes a Refer-To identifying the transfer target endpoint and associated dialog. When the SBC receives the REFER request (e.g., because it is positioned between the transferee and transferor (aka transfer initiator), the SBC is configured to perform the following sub-steps. Initially, the SBC checks to see if the Refer-To address matches the address of one of its network interfaces. If so, the SBC will replace the Refer-To address with its other network interface address. For example, if the REFER request is addressed to a public address, the Refer-To address will be replaced with the private address used by the SBC. This occurs when the transferor is on the public side of the network interface and the REFER is crossing to the private network. If, however, there is not a match, then the SBC will generate a mapping key to the original Refer-To address. The SBC then replaces the original Refer-To address with the SBC's public network interface address including the generated key as a URI parameter. This will be the case when the transferor is in the private network, the transferee is in the public network and the REFER is crossing from the private network to the public network.

It should be noted that if the transferor is on the public side of the network interface, then an optimization could be exploited whereby the SBC can instead map the Refer-To address to its "next-door neighbor" so that it needn't handle the subsequent INVITE-Replaces.

It should also be noted that if privacy is not desired and if the SBC is the configured outbound proxy for the transferee then the mapping described above which utilizes the dynamically-generated mapping key is not required.

The second step of the process occurs when the SBC sends the newly-edited REFER along to the transferee. Specifically, the transferee consumes the REFER received from the SBC and generates a new INVITE targeting to refer-to address (which is the address of the transfer target) with replaces header containing transfer-target's SIP dialog information. If the transferor is on the public side of the network interface, then the INVITE comes back to the SBC from the transferee and the SBC can be configured to act according to the rules specified in U.S. patent application Ser. No. 13/770,551, filed Feb. 19, 2013, the entire contents of which are hereby incorporated herein by reference, by replacing the R-URI and Replaces dialog ID with those of its next-door neighbor. If, however, the transferor is in the private network, then the SBC can be configured to use the key in the R-URI to look up the original Refer-To address and will replace the R-URI with this address.

Another aspect of the present disclosure is to protect the SBC from memory leaks. One way to achieve this feature is to configure the SBC to start a timer at the time of mapping key creation. On timer expiry, the SBC should then remove the mapping key from its memory by either deleting it or re-writing the mapping key with different data.

Based on the above, it is an aspect of the present disclosure to enable call transfers to occur between endpoints which are located across network border elements.

In accordance with at least some embodiments of the present disclosure, a method of facilitating a call transfer between a transferor, a transferee, and a transfer target is provided which generally comprises:

receiving a Session Initiation Protocol (SIP) transfer message at a network border element, the SIP transfer message comprising a first address in a Refer-to field of the SIP transfer message when received at the network border element;

determining whether the SIP transfer message is traveling from an untrusted network to a trusted network or from a trusted network to an untrusted network; and replacing a Refer-to field of the SIP transfer message with a second address that is selected based on results of the determination.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
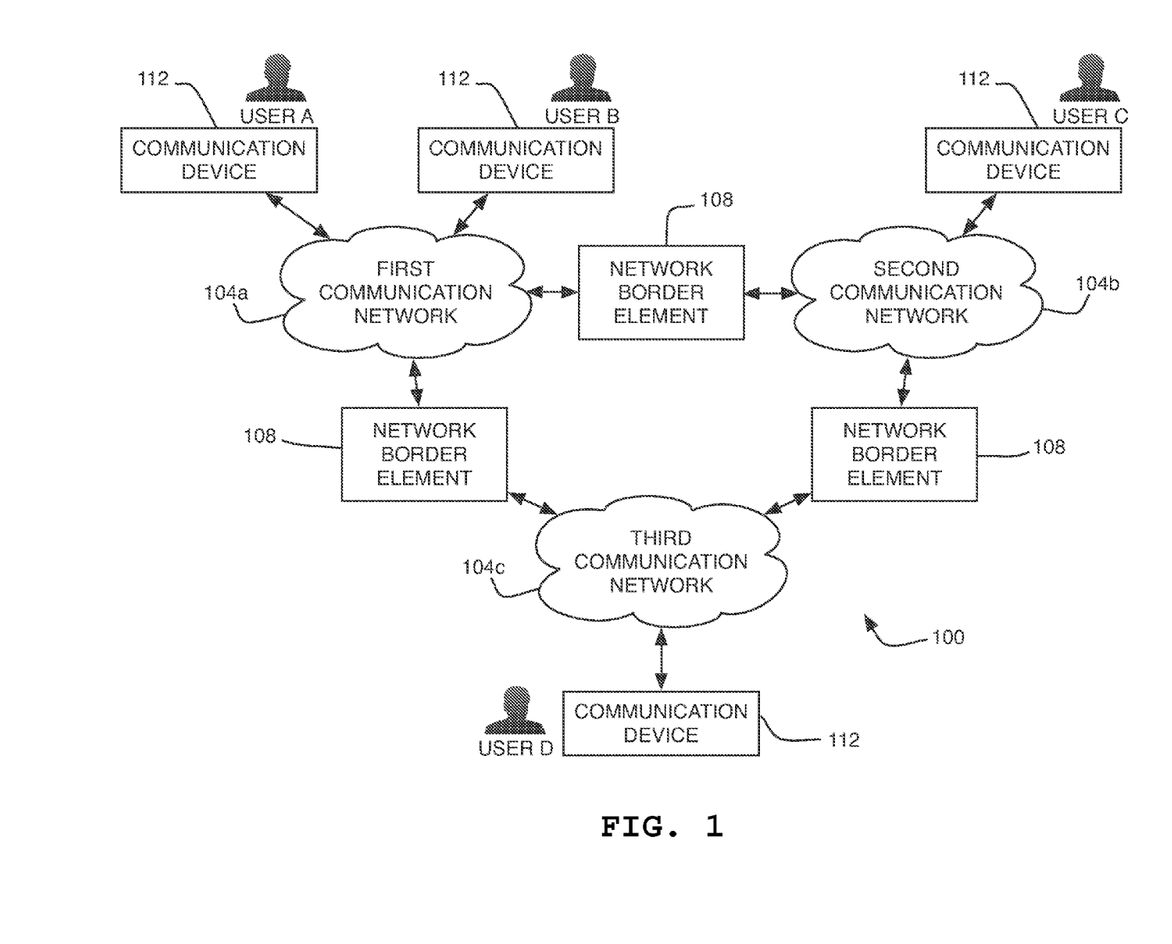
FIG. 1 is a block diagram of a first communication system in accordance with embodiments of the present disclosure.

With reference initially to FIG. 1, a first communication system 100 is depicted in accordance with embodiments of the present disclosure. The first communication system 100 is shown to include a plurality of communication networks 104a, 104b, 104c, each being separated from one another with a network border element 108. It should be appreciated that multiple network border elements 108 may be provided between two communication networks. For instance, each network 104a, 104b, 104c may comprise its own network border element 108. As a further example, if each network 104a, 104b, 104c has its own network border element 108, two network border elements 108 may reside between the first communication network 104a and third communication network 104c.

The communication system 100 further includes a plurality of communication devices 112 that are connected to one another via the interconnection of the communication networks 104a, 104b, 104c. In some embodiments, the various communication devices 112 may be owned and administered by an administrator or provider of a particular communication network. As an example, the communication networks 104a, 104b, 104c may comprise either a public or private communication network. As a further example, the communication network 104a, 104b, 104c may facilitate communications via packet-switched or circuit-switched protocols. Non-limiting examples of the networks 104a, 104b, 104c include the Internet, the Public Switched Telephone Network (PSTN), a cellular network, an IMS network, an ISDN network, a Voice over IP (VoIP) network, any other packet-switched network, any other circuit-switched network, or combinations thereof. In one configuration, one of the communication networks 104 may correspond to a public or untrusted communication network, such as the Internet, whereas the two other communication networks 104 may correspond to enterprise communication networks, IMS networks, cellular networks or the like.

The network border elements 108 may correspond to any type of communications device or collection of devices that provide security for a communication network (e.g., separate a trusted network from an untrusted network, act as a firewall, etc.), perform network address translations between networks, perform coding/decoding operations to connect networks of different types, etc. Examples of network border elements 108 include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, encryption, packet tunneling, etc. as necessary to provide interoperability and/or security for a communication network 104.

As will be discussed in further detail herein, it may be possible for users involved in a communication session to transfer calls to other users, regardless of whether or not the transfer process traverses one or more network border elements 108. As one non-limiting example, user A and user C may be involved in a communication session and then user A may transfer user C to user B, even though user C is separated from users A and B via a network border element 108. As another non-limiting example, user A and user C may be involved in a communication session and then either user A or user C may transfer the other to user D, even though user D is separated from both users A and C. As another non-limiting example, user A and user B may be involved in a communication session and user A may transfer user B to user C or user D. As still another non-limiting example, user C and user D may be involved in a communication session and user C or D may transfer the other user to users A or B.

Embodiments of the present disclosure enable the transferring of calls across one or more network border elements 108. In some embodiments, this transfer may be facilitated when one of the parties to the transfer (e.g., transferor, transferee, transfer-target, etc.) is using a communication device 112 connected to a private, trusted, or secured communication network, while another one of the parties to the transfer is using a communication device 112 connected to a public, untrusted, or unsecured communication network.

Figure 2:
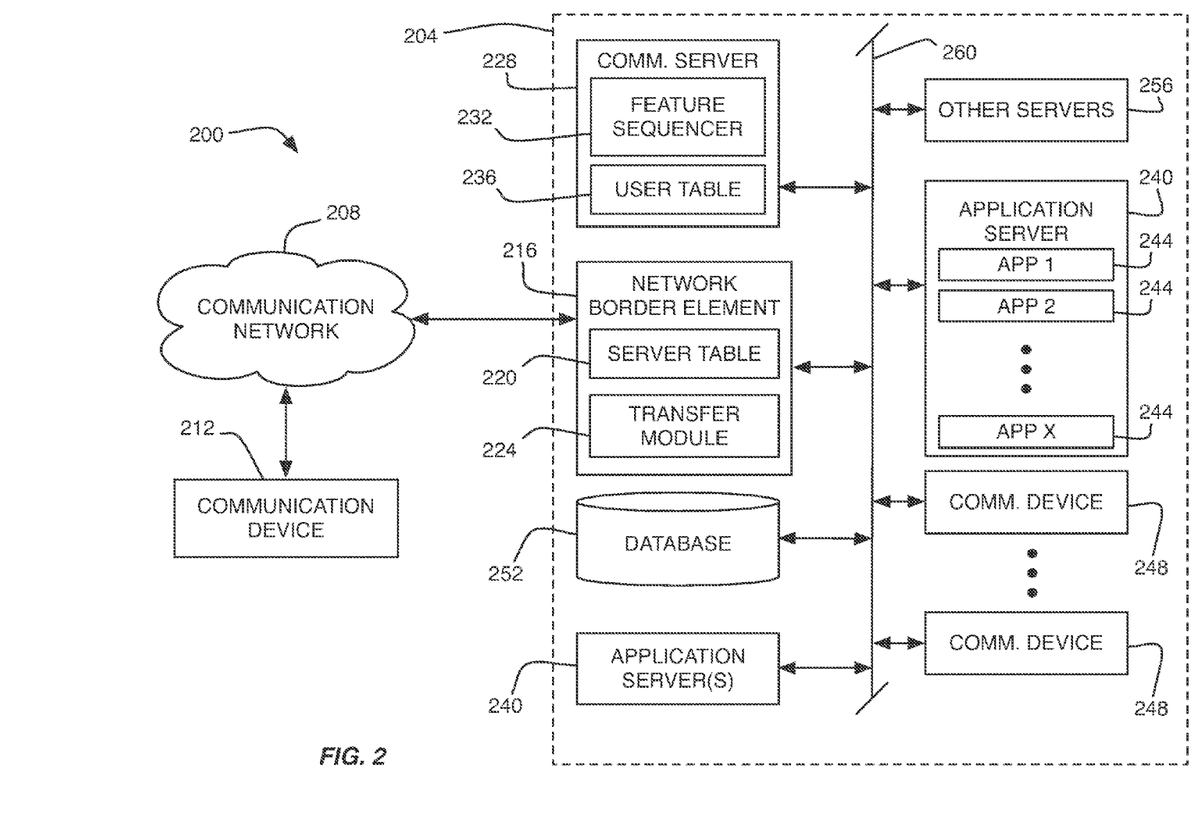
FIG. 2 is a block diagram of a second communication system in accordance with embodiments of the present disclosure.

With reference now to FIG. 2, additional details of a communication system 200 will be described in accordance with embodiments of the present disclosure. The communication system 200 may comprise similar components to the communication system 100. In particular, the communication system 200 is depicted as comprising an enterprise network 204 that is connected to one or more external communication devices 212 via a communication network 208. The communication device 212 may be similar or identical to the communication devices 112 and the communication network 208 may correspond to one or more of the communication networks 104*a*, 104*b*, 104*c*.

Components of the enterprise network 204 are depicted as including a network border element 216, a communication server 124, a plurality of communication devices 248 (which may also be similar or identical to the communications devices 112), one or more application/media servers 240, other servers 256, and an enterprise database 252. It should be appreciated that one or more of the components depicted as being within the enterprise network 204 may alternatively or additionally be provided outside the enterprise network 204.

In some embodiments, the communication network 208 may correspond to any type of communication network, such as the communications network 104*a*, 104*b*, 104*c* described above.

The external communication devices 212 are generally referred to as "external" because they are either not under the direct control of the enterprise administering the enterprise network 204 or have a decreased level of trust with the enterprise network 204 as compared with communication devices 248 that are within the enterprise network 204. Illustrative types of external communication devices 212 include, without limitation, cellular phones, laptops, tablets, Personal Computers (PCs), Personal Digital Assistants (PDAs), digital phones, analog phones, and the like.

The communication devices 248 within the enterprise network 204, similar to the external communication devices 212, may correspond to user communication devices and, in some embodiments, may correspond to a UA or multiple UAs of enterprise users. Examples of communication devices 248 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 248 may be configured to support single or multi-user interactions with other communication devices 248 within the enterprise network 204 as well as other communication devices 212 that are external to the enterprise network 204.

The communication devices 212, 248 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 208 and/or within the enterprise network 204.

The enterprise network 204 may correspond to either a single-location enterprise network or a multi-location enterprise network. A single-location enterprise network may comprise a network backbone 260 that corresponds to a Local Area Network (LAN) that includes wired (e.g., Ethernet) and/or wireless (e.g., Wi-Fi) technologies. A multi-location enterprise network may comprise a network backbone 260 that is a Wide Area Network (WAN), which connects a plurality of LANs or similar network locations via one or more untrusted networks, such as the communication network 208.

In some embodiments, the network border element 216 is provided to separate the external communication devices 212 and the untrusted communication network 208 from the network backbone 260 and components contained within the enterprise network 204. As an example, the network border element 216 operates to secure the enterprise network 204 from malicious attacks from the communication network 208.

The network border element 216 may be provided with a server table 220 and a transfer module 224. The server table 220 may correspond to any data structure or collection of data structures that enables the network border element 216 to appropriately route messages from the external communication devices 12 to one or more communication servers 228 of the enterprise network 204. Specifically, while the enterprise network 204 is only depicted as having a single communication server 228, it should be appreciated that some enterprise networks 204 may comprise a plurality of communication servers 228 and each of those servers may be authoritative for (e.g., provide services for) a subset of enterprise users. In such a scenario, messages received at the network border element 216 will be routed to the appropriate communication server 228 by referring to entries in the server table 220 that may define which communication server 228 is authoritative for an enterprise user that is a target of the received message.

The transfer module 224 may be provided with logic that enables the network border element 216 to facilitate the transfer of a communication session or call when the transfer event is crossing the network border element 216. As will be discussed in further detail herein, the network border element 216 may utilize the transfer module 224 to process transfer messages (e.g., SIP REFER messages, INVITE-Replaces messages, etc.) thereby enabling a transfer to occur seamlessly even though one of the transfer participants is separated by others of the transfer participants by the network border element 216.

The transfer module 224, in operation, may facilitate an attended and/or semi-attended transfer between users within the enterprise network 204, in a different enterprise network, and/or at an external communication device 212. It should be appreciated that the transfer module 224 may reside, completely or partially, in the communication server network border element 216, the communication server 228, an application/media server 240, or any other device depicted in any of the figures. In some embodiments, the transfer module 224 may be implemented by a server or communication device that places itself in a communication session as a B2BUA as a sequenced application.

In some embodiments, the communication server 228 may be used to help establish communication sessions and/or move signaling paths, change call topology, etc. Specifically, the communication server 228 may include a Private Branch eXchange (PBX), an enterprise switch, an enterprise server, combinations thereof, or any other type of telecommunications system switch or server. The communication server 228 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, Multi-Vantage Express™, and combinations thereof.

As noted above, although only a single communication server 228 is depicted in FIG. 1, two or more communication servers 228 may be provided in a single enterprise network 204 or across multiple separate LANs 260 owned and operated by a single enterprise, but separated by the untrusted communication network 208. In configurations where an enterprise or an enterprise network 204 includes two or more communications servers 228, each server 228 may comprise similar functionality, but may be provisioned for providing its features to only a subset of all enterprise users. In particular, a first communication server 228 may be authoritative for and service a first subset of enterprise users whereas a second communication server 228 may be authoritative for and service a second subset of enterprise users, where the first and second subsets of users generally do not share a common user.

Additionally, multiple servers 228 can support a common user community. For example, in geo-redundant and other applications where users aren't necessarily bound to a single application server, there may be a cluster of equivalent servers where a user can be serviced by any server in the cluster.

A communication server 228 can be configured to include user communication preferences in a user table 236, which map, for a corresponding (enterprise subscriber) user, to a set of communication preferences to be invoked for an incoming and/or outgoing contact for each user for whom it is authoritative. Even more specifically, communications between internal enterprise users (e.g., internal communication devices 248) may first be serviced by the originating user's authoritative communication server 228 during the origination phase of communications set-up. After the origination phase is complete, the authoritative communication server 228 of the terminating (or called) user may be invoked to complete the termination phase of communications set-up. In some embodiments, the communication server 228 for the originating and terminating user may be the same, but this is not necessarily required. In situations where more than two enterprise users are involved in a communication session, authoritative communications servers 228 for each of the involved users may be employed without departing from the scope of the present invention.

Additionally, the authoritative communications servers 228 for each user may be in the same enterprise network 204 or in different enterprise networks 204, which are owned by a common enterprise but are separated by an untrusted communication network 208. When an external communication device 212 is involved in at least one of a call and/or transfer, then yet another communication server 228 may invoked to sequence applications, as needed.

In accordance with at least some embodiments of the present disclosure, the communication sever 228 may include a feature sequencer 232 that is configured to instantiate the communication preferences for a calling and/or called user, regardless of whether or not the calling and/or called user are using an external communication device 212 or internal communication device 248. In some embodiments, the user communication preferences in the user table 236 may be provisioned by users and/or by administrative personnel. The communications preferences for a particular user are referenced by the feature sequencer 232 to determine which, if any, features should be incorporated into a communication session for the user. The feature sequencer 232 can actually provide communication features directly into the communication session or the feature sequencer 232 can determine an application sequence which will be invoked during set-up and used during the communication session. As can be appreciated, the application sequence can be set-up for new communication sessions or during a transfer event.

In accordance with at least some embodiments, the communication server 228 can determine an application sequence and cause one or more applications 244 to be sequenced into a communication session. In particular, the communication server 228 is configured to analyze a particular user's communication preferences as defined in the user table 236 and invoke the necessary applications 244 to fulfill such preferences. Once an application sequence is determined for a calling and/or called user, the communications server 228 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 228 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 240 are depicted, one skilled in the art will appreciate the one, two, three, or more applications servers 240 can be provided and each server may be configured to provide a single application or a set of applications 244. The applications provided by a particular application server 240 may vary depending upon the capabilities of the server 240 and in the event that a particular application server 240 comprises a set of applications 244, one, some, or all of the applications in that set of applications 244 may be included in a particular application sequence. There is no requirement, however, that all applications in a set of applications 244 be included in an application sequence and there is no requirement as to the order in which applications are included in the application sequence. Rather, the application sequence is usually determined based on a user's communication preferences, which can be found in the user communication preferences table 236. Alternatively, or in addition, the applications that appear in a user's sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences related to transfer events. For instance, it may be possible for a user to define what types of applications should be sequenced if that user is a transferor, a transferee, and/or a transfer target, and the application sequence may vary depending upon the role of the user in the transfer event.

The applications included in a particular application sequence are generally included to accommodate the user's preferences. Applications may vary according to media-type, function, and the like. Exemplary types of applications include, without limitation, an EC-500 (extension to cellular) application, a call-setup application, a call-recording application, a dynamic device pairing application, a voicemail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In some embodiments, when the communication server 228 includes one or more applications 244 in a communication session, those applications may be configured to behave as a B2BUA. When an application, or any other communication element, behaves as a B2BUA, the application inserts itself in the control signaling path so that it can maintain complete call state and participate in all call requests. Likewise, when a communication session involves communication device 212 and communication device 248, the network border element 216 or its components may be incorporated into the communication session as a B2BUA, which means that all call control signaling passes through the network border element 216.

The other servers 256 may include any other type of server or switch needed for operating the enterprise network 204. Examples of suitable other servers 256 include, without limitation, presence servers, Instant Messaging (IM) servers, email servers, voicemail servers, virtual machines, web servers, call center servers, Interactive Voice Response (IVR) units, etc.

The enterprise database 252 may include information regarding enterprise users and/or non-enterprise users. Specifically, the enterprise database 252 may comprise information that identifies enterprise users, their relative position within the enterprise hierarchy, network permissions, communication permissions, Customer Relationship Management (CRM) information, etc. The enterprise database 252 may be any type of data storage system and may include one or more hierarchical databases, relational databases, or any other type of known database structure such as a SQL database. Alternatively or additionally, the database 252 may be constructed as a no-SQL database. The enterprise database 252, although depicted as being separate from the user communication preferences 236 in the communication server 228, may comprise the data regarding user communication preferences 236 and may be accessible to the communication server 228 via a database lookup or query/response protocol.

It should be appreciated that some or all of the functions depicted in FIG. 2 may be co-hosted and/or co-resident on a single server. The depiction of components in FIG. 2 is generally intended to be a logical depiction of the components of the system 200.

Figure 3A:
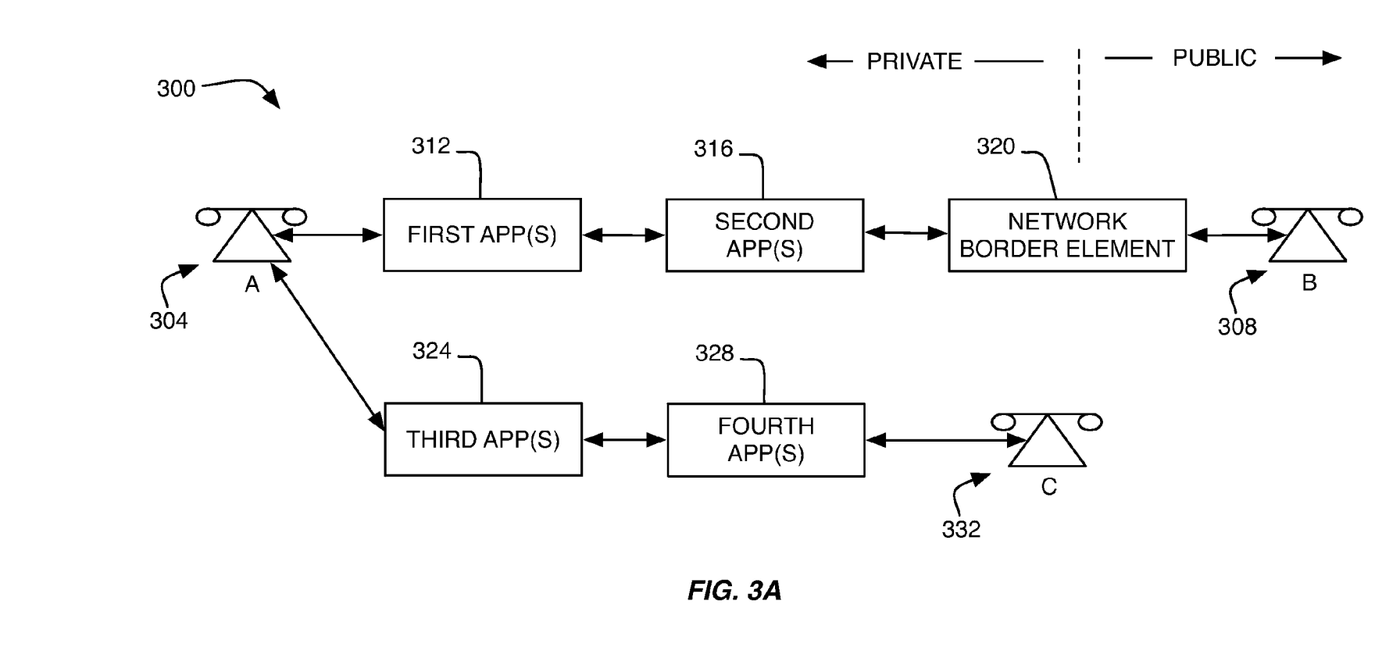
FIG. 3A is a block diagram of first call topology in accordance with embodiments of the present disclosure.
Figure 3B:
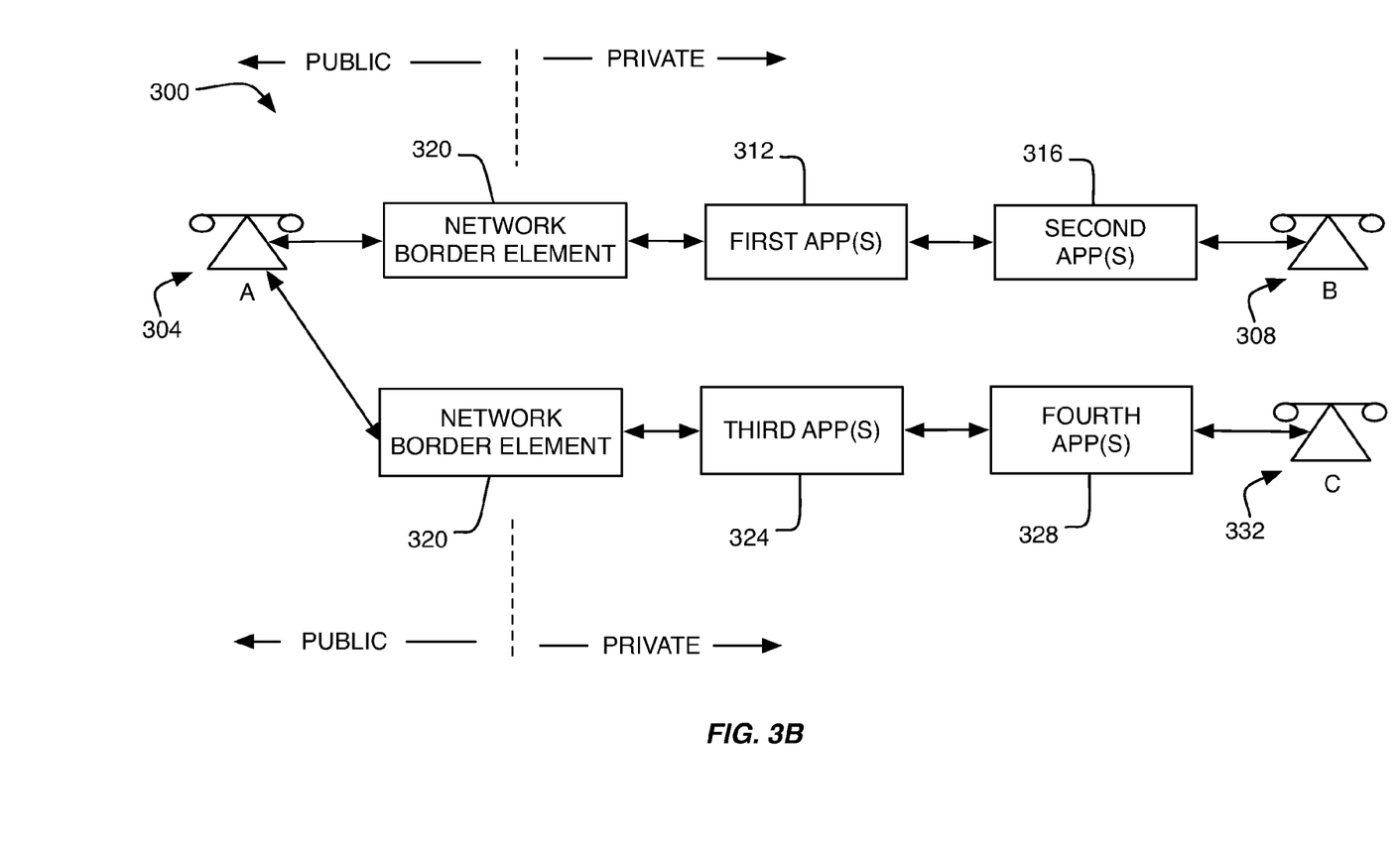
FIG. 3B is a block diagram of a second call topology in accordance with embodiments of the present disclosure.

With reference now to FIGS. 3A and 3B, additional features of the network border element 320 (or the transfer module 224 contained therein) and its ability to facilitate a transfer event will be described in accordance with at least some embodiments of the present disclosure. Specifically, FIG. 3A depicts a call topology 300 where a first user (e.g., User A) is involved in a communication session (e.g., first communication session) with a second user (e.g., User B) and then User A attempts to transfer User B to another user, User C. In the depicted embodiment, User A and User B are separated from one another by a network border element 320, which may be similar or identical to the network border elements 108, 216 depicted in FIGS. 1 and 2, respectively. This particular topology also shows User A and User C as being connected to a common communication network (e.g., not being separated by a network border element 320). As examples, the first communication device 304 used by User A and the third communication device 332 used by User C may correspond to internal communication devices 248 whereas the second communication device 308 used by User B may correspond to an external communication device 212.

Although not depicted, other users may be involved in the first communication session and may be conferenced into the first communication session via a mixer at User A's endpoint 304, via a mixer at User B's endpoint 308, or via a centralized conference bridge. In some embodiments, User A may have one or more applications (e.g., first application(s) 312) sequenced into the first communication session in accordance with defined preferences in the user table 236 for User A. Likewise, User B may have one or more applications (e.g., second application(s) 316) sequenced into the first communication session in accordance with defined preferences in the user table 236 for User B. In some embodiments, the second applications 316 may correspond to specific applications defined for User B when User B is external to the private network or they may correspond to default applications used for any communications used for an external communication device 212.

The application(s) 312, 316 may correspond to one or more applications 344 within an enterprise network 204 or they may correspond to applications external to the enterprise network 204. Alternatively or additionally, the communication server 228 may be sequenced into the first communication session. In some embodiments, the application(s) 312, 316 may be sequenced into the first communication session and behave as B2BUAs, proxies, or the like.

Since the communication session between User A and User B crosses a network boundary (e.g., from a private to a public network), a network border element 320 is also incorporated into the application sequence and the network border element 320 also behaves as a B2BUA.

At some point during the first communication session, the determination may be made to have User A transfer User B to another user (e.g., User C). When this determination is made, User A (the transferor) may initiate a transfer process by dialing out to User C. This may occur with or without User B being put on hold by User A. When User A dials User C, another set of applications (e.g., third application(s) 324) may be sequenced on behalf of User A. These applications may be the same or different from the first application(s) 312 and they may also include the communication server 228 that is authoritative for User A.

Once all application(s) 324 have been sequenced for User A, one or more applications (e.g., fourth application(s) 328) may be sequenced for User C. These applications may include one or more applications 244 and/or a communication server 228 that is authoritative for User C.

FIG. 3B depicts an alternative call topology 300 where the transferor (e.g., User A) is on the public side of a network border element 320 and the other parties to the transfer (e.g., User B and User C) are on the private side of the network border element 320. Similar to the topology of FIG. 3A, each User may have one or more applications sequenced into the communication session on their behalf. In this particular embodiment, however, the network border element 320 is sequenced prior to sequencing the other applications 312, 316, 324, 328 since the applications are on in the private network (e.g., enterprise network 204) whereas the first communication device 304 used by User A is on an external communication device 212.

Figure 4:
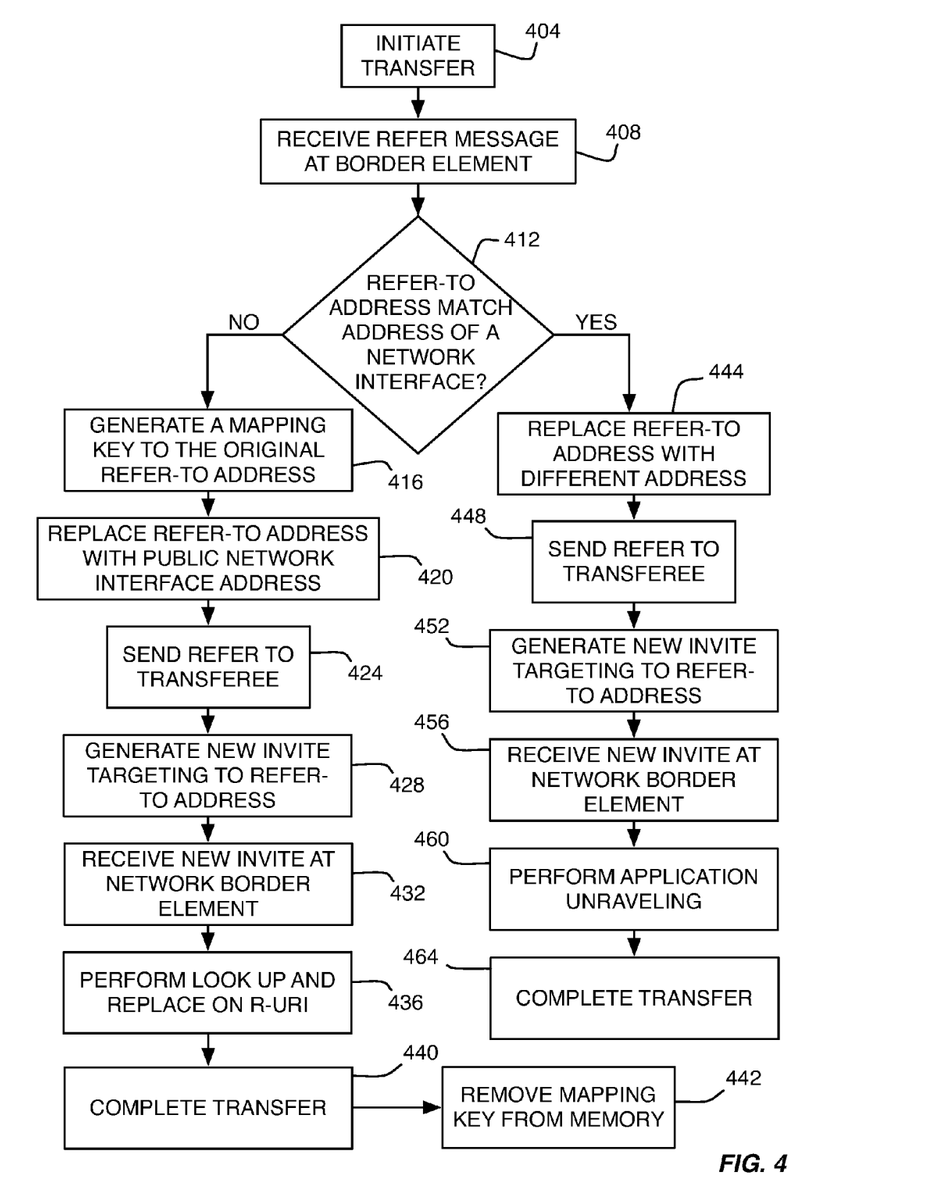
FIG. 4 is a flow diagram depicting a transfer method in accordance with embodiments of the present disclosure.

With reference now to FIG. 4, a method of transferring a call according to either the topology of FIG. 3A or 3B will be described in accordance with at least some embodiments of the present disclosure. The method will be described in connection with a call transfer event where the call transfer participants includes a transferor (e.g., User A) a transferee (e.g., User B), and a transfer-target (e.g., User C).

The method begins when the transferor (e.g., User A) initiates a transfer event (step 404). The transfer event may be initiated when the transferor uses their communication device 304 to transmit a transfer message, such as a SIP REFER message. The REFER message is initially transmitted toward the transfer target, but will first need to traverse the applications established between the participants of the existing communication session. In some embodiments, the REFER message is transmitted with a Refer-to field having an address of the transfer target endpoint (e.g., the address of the third communication device 332 being used by User C). The method continues when the REFER message is received at the network border element 320 (step 408). As can be appreciated, the REFER message may be received before or after the REFER message has traversed other applications in the application sequence, dependent upon whether the transferor is on the public side or private side of the network boundary device 320.

When the network boundary device 320 receives the REFER message, the network boundary device 320 invokes the transfer module 224 to analyze the REFER message. More specifically, the transfer module 224 of the network boundary device 320 may determine whether the Refer-to address of the REFER message matches an address of the network boundary device's 320 network interface (step 412). This step will be answered positively or negatively depending upon whether the transferor is on the private side (e.g., as shown in FIG. 3A) or public side (e.g., as shown in FIG. 3B) of the network boundary device 320.

If the Refer-to address does not match a network interface address of the network boundary device 320, then it can be determined that the transferor is on the private side of the network boundary device 320 and the transferee (e.g., User B) is on the public side of the network. Thus, if the query of step 412 is answered negatively, then the network border element 320 continues by generating a mapping key and associating that dynamically-generated mapping key with the address originally contained in the Refer-to field of the REFER message (step 416). The dynamically-generated mapping key may be stored in memory of the network border element 320 along with the original address of the Refer-to field, thereby creating an association between the two numbers.

Once the network border element 320 has created an association between the dynamically-generated mapping key and the original Refer-to address, the network border element replaces the Refer-to address of the REFER message with the public network interface address of the network border element 320 (step 420). In this step, the network border element 320 may also include the dynamically-generated mapping key as a URI parameter in the REFER message. Thus, the REFER message now contains a new Refer-to address corresponding to the public network interface address of the network border element 320 along with the dynamically-generated mapping key. It should be noted, however, that if privacy is not desired and if the network boundary element 320 is the configured outbound proxy for the transferee, then this mapping step (e.g., placement of the dynamically-generated mapping key into the URI parameter of the REFER message) is not necessarily required.

Once the REFER message has been modified by the network boundary element 320, the method continues with the network boundary element 320 transmitting the REFER message to the transferee (step 424). The communication device 308 of the transferee receives the REFER message and, in response thereto, generates a new SIP INVITE message targeting the Refer-to address identified in the REFER message (step 428). As can be appreciated, since the network border element 320 modified the REFER message to have its public network interface address in the Refer-to address, the new INVITE message will target the public network interface address of the network border element 320. The INVITE message may also include a replaces header containing the transfer-target's SIP dialog information. Thus, when the INVITE message (e.g. INVITE with Replaces or INVITE-Replaces) is transmitted by the transferee's device, the INVITE message travels back to the network border element 320, but targets the transfer-target (step 432).

Upon receiving the INVITE message at the network border element 320, the network border element 320 will use the key in the R-URI of the INVITE message to look up the original Refer-to address of the REFER message (e.g., as generated by the transferor) and replace the R-URI with the address of the transfer-target (step 436). Because the dynamically-generated mapping key was stored in association with the original Refer-to address, the process of looking up and replacing is performed relatively easily and quickly by the network border element 320. The modified INVITE message is then transmitted by the network border element 320 along to the transfer target's communication device 332 so that the transfer process can be completed (step 440). The method then continues with the network border element 320 removing the mapping key from its memory (step 442). In some embodiments, the mapping key may be removed upon completion of the INVITE-Replaces transaction and no timer is needed. In other embodiments, and as will be discussed in further detail below, it may be desirable to protect the network border element 320 from memory leaks; thus, the network border element 320 may start a timer when the mapping key is generated and, upon timer expiry, the mapping key can be removed from memory.

Referring back to step 412, if the query made by the network border element 320 upon initially-receiving the REFER message was answered affirmatively (e.g., the Refer-to address matches an address of the network border element's 320 network interface), then the network border element 320 knows that the REFER message was addressed to its public address and the transferor is on the public side of the network border element 320 as shown in FIG. 3B. Upon making this determination, the network border element 320 will replace the Refer-to address of the REFER message with a different address (step 444). In some embodiments, the Refer-to address is replaced with the private address of the network border element 320. In some embodiments, the Refer-to address is replaced with a next-door neighbor of the network border element (e.g. a first sequenced application in the first applications 312). Replacement of the Refer-to address with an address of the next-door neighbor will enable the network border element 320 from having to handle subsequent INVITE-Replaces messages. Instead, this processing can be done entirely within the private enterprise network 204.

Once the Refer-to field has been replaced with a new address, the network border element 320 transmits the REFER message to the transferee (step 448). Upon receiving the REFER message, the transferee generates a new INVITE message targeting to the address contained within the Refer-to field of the REFER message (step 452). The INVITE message may also include a replaces header containing the transfer-target's SIP dialog information.

This new INVITE message (e.g. INVITE with Replaces or INVITE-Replaces) is transmitted back to the network border element 320 (step 456). Upon receiving the INVITE message, the network border element 320 may perform application unraveling (step 460) and complete the transfer (step 464). Additional details of the application unraveling and completion of a transfer are provided in U.S. patent Publication Ser. No. 13/770,551, filed Feb. 19, 2013, the entire contents of which are hereby incorporated herein by reference.

Figure 5:
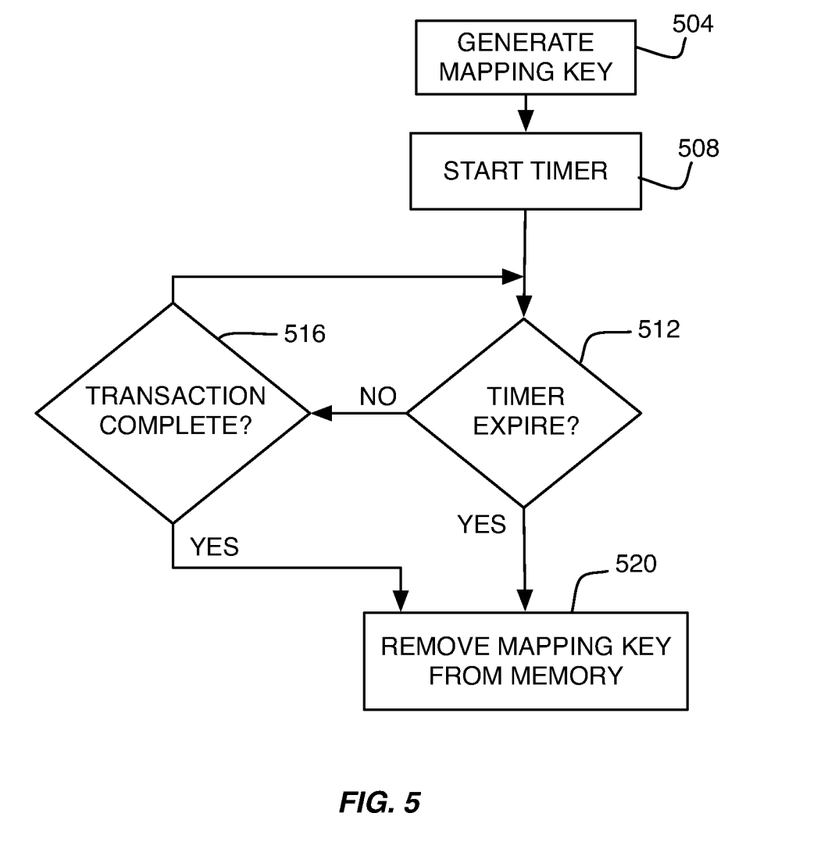
FIG. 5 is a flow diagram depicting a memory management method in accordance with embodiments of the present disclosure.

With reference now to FIG. 5, a memory-management method will be described in accordance with at least some embodiments of the present disclosure. As discussed above, the network border element 320 may benefit from memory-management techniques when preparing and using dynamically-generated mapping keys. The method begins when the network border element 320 generates a new mapping key (step 504). Upon generating the mapping key, the network border element 320 will store the mapping key in memory and begin a timer (step 508). The timer may begin counting down from a predetermined timer value (e.g., 30 seconds, 1 minute, 10 minutes, 1 hour, etc.). The network border element 320 will wait until the timer has expired (step 512) or until the INVITE-Replaces transaction has completed (step 516). If the timer has not expired and the transaction is not yet complete, then the method returns to step 512. If either the timer expires or the transaction completes, however, then the mapping key is removed from memory of the network border element 320 (step 520). The mapping key can be removed from memory by deletion or overwriting with other data.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of facilitating a call transfer between a transferor, a transferee, and a transfer target, the method comprising:
   receiving a Session Initiation Protocol (SIP) transfer message at a network border element, the SIP transfer message comprising a first address in a Refer-to field of the SIP transfer message when received at the network border element;
   determining that the SIP transfer message is traveling from a first network to a second network via the network border element;
   determining whether the first address in the Refer-to field matches an address of a network interface of the network border element; and
   replacing, by the network border element, the first address in the Refer-to field of the SIP transfer message with a second address.

2. The method of claim 1, wherein the second address corresponds to a public network interface address of the network border element, the method further comprising:
   generating a mapping key;
   associating the mapping key with the first address; and
   storing the mapping key in memory of the network border element.

3. The method of claim 2, further comprising:
   including the mapping key in a URI parameter of the SIP transfer message; and transmitting the SIP transfer message having the second address and mapping key in the URI parameter to a communication device of the transferee.

4. The method of claim 3, further comprising:
   receiving an INVITE-Replaces message at the network border element;
   determining that the INVITE-Replaces message comprises the mapping key in its R-URI parameter; and
   modifying the INVITE-Replaces message at the network border element such that the first address is the R-URI;
   wherein the generating step, the associating step, and the storing step are all performed by the network border element.

5. The method of claim 2, further comprising:
   starting a timer upon generation of the mapping key;
   determining that at least one memory-clearing condition has been met: (i) the timer has expired and (ii) processing of the INVITE-Replaces at the network border element is complete; and
   upon determining that the at least one memory-clearing condition has been met, removing the mapping key from the memory of the network border element.

6. The method of claim 1, wherein the second address is determined by the network border element and the second address corresponds to at least one of a private network interface address of the network border element and an address of a next-door neighbor of the network border element in an application sequence, and wherein the SIP transfer message having the second address is transmitted to the transferee by the network border element.

7. The method of claim 6, further comprising:
   receiving an INVITE-Replaces message at the network border element;
   replacing an R-URI parameter of the INVITE-Replaces message with an address of the next-door neighbor; and
   transmitting the INVITE-Replaces message to the next-door neighbor thereby enabling the network border element to remove itself from the application sequence.

8. The method of claim 1, further comprising generating a mapping key, associating the mapping key with the first address, including the mapping key in a URI parameter of the SIP transfer message, receiving an INVITE-Replaces message at the network border element, and determining that the INVITE-Replaces message comprises the mapping key in its R-URI parameter.

9. The method of claim 1, wherein the Refer-to field of the SIP transfer message is replaced with the second address, and the second address is one of a private network address of the network border element and an address of a next-door neighbor of the network border element.

10. The method of claim 1, wherein the SIP transfer message comprises a REFER message, wherein the network border element comprises a Session Border Controller (SBC), and wherein the first network comprises the Internet and wherein the second network comprises an enterprise network.

11. A non-transitory computer-readable medium comprising processor-executable instructions that are executable by a processor, the instructions, when executed, enabling a call transfer between a transferor, a transferee, and a transfer target, the instructions comprising:
   instructions that receive a Session Initiation Protocol (SIP) transfer message, the SIP transfer message comprising a first address in a Refer-to field of the SIP transfer message when received;
   instructions that determine whether the SIP transfer message is traveling from an untrusted network to a trusted network or from a trusted network to an untrusted network;
   instructions that determine whether the first address in the Refer-to field matches an address of a network interface of the processor; and
   instructions that configured to replace, by the processor, the first address in the Refer-to field of the SIP transfer message with a second address.

12. The computer-readable medium of claim 11, wherein the instructions are stored in memory of a network border element and wherein the second address corresponds to a public network interface address of the network border element, the instructions further comprising:
   instructions that generate a mapping key;
   instructions that associate the mapping key with the first address; and instructions configured to store the mapping key in memory of the network border element.

13. The computer-readable medium of claim 12, the instructions further comprising:
   instructions that include the mapping key in a URI parameter of the SIP transfer message; and
   instructions that transmit the SIP transfer message having the second address and mapping key in the URI parameter to a communication device of the transferee.

14. The computer-readable medium of claim 13, the instructions further comprising:
   instructions that receive an INVITE-Replaces message at the network border element;
   instructions that determine that the INVITE-Replaces message comprises the mapping key in its R-URI parameter;
   instructions that modify the INVITE-Replaces message to include the first address in the R-URI parameter; and
   instructions that remove the mapping key from the memory of the network border element.

15. The computer-readable medium of claim 12, the instructions further comprising:
- instructions that start a timer upon generation of the mapping key;
- instructions that determine that the timer has expired; and
- instructions that remove the mapping key from the memory of the network border element upon determining that the timer has expired.

16. A Session Border Controller (SBC), comprising:
- a processor; and
- memory including a transfer module, the transfer module, when executed by the processor, enabling the SBC to facilitate a transfer between transfer participants that are separated from each other by the SBC, wherein the transfer module is configured to determine whether an address in a Refer-to field matches an address of a network interface of the SBC, and replace the address in the Refer-to field of a Session Initiation Protocol (SIP) transfer message with a second address based on whether the SIP transfer message is travelling between networks via the SBC.

17. The SBC of claim 16, wherein the SBC comprises a private network interface address and a public network interface address and wherein the transfer module is configured to analyze the Refer-to address of the SIP transfer message to determine whether the SIP transfer message is travelling from an untrusted network to a trusted network or from a trusted network to an untrusted network.

18. The SBC of claim 16, wherein the SIP transfer message comprises a REFER message.

* * * * *

UNITED STATES PATENT AND TRADEMARK OFFICE
CERTIFICATE OF CORRECTION

| | |
|---|---|
| PATENT NO. | : 9,467,570 B2 |
| APPLICATION NO. | : 14/084842 |
| DATED | : October 11, 2016 |
| INVENTOR(S) | : Frank Boyle, Vipul Rastogi and Jowl M. Ezell |

Page 1 of 1

It is certified that error appears in the above-identified patent and that said Letters Patent is hereby corrected as shown below:

In the Claims

At Column 16, Line 35, Claim 11, after "instructions that" delete the phrase "configured to" therein.

Signed and Sealed this
Tenth Day of January, 2017

Michelle K. Lee
*Director of the United States Patent and Trademark Office*